US010177899B2

(12) United States Patent
Kozica et al.

(10) Patent No.: US 10,177,899 B2
(45) Date of Patent: Jan. 8, 2019

(54) ADAPTING A JITTER BUFFER

(71) Applicant: Microsoft Technology Licensing, LLC, Redmond, WA (US)

(72) Inventors: Ermin Kozica, Stockholm (SE); Wei Chen, Stockholm (SE); David Yuheng Zhao, Enebyberg (SE); Christopher Asgaard Rödbro, Stockholm (SE); Jesus de Vicente Peña, Stockholm (SE)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/184,492

(22) Filed: Feb. 19, 2014

(65) Prior Publication Data
US 2015/0110134 A1 Apr. 23, 2015

(30) Foreign Application Priority Data

Oct. 22, 2013 (GB) .................................. 1318653.1

(51) Int. Cl.
H04L 7/00 (2006.01)
H04L 29/06 (2006.01)
(Continued)

(52) U.S. Cl.
CPC .......... *H04L 7/0041* (2013.01); *H04L 7/0033* (2013.01); *H04L 65/80* (2013.01);
(Continued)

(58) Field of Classification Search
CPC .... H04N 21/242; H04N 21/2343; H04N 5/04; H04N 21/4307; H04N 21/6437;
(Continued)

(56) References Cited

U.S. PATENT DOCUMENTS 7,084,898 B1 8/2006 Dunn et al.
8,213,444 B1 7/2012 Harris et al.
(Continued)

FOREIGN PATENT DOCUMENTS

EP 1775964 4/2007
WO WO-2011092244 8/2011

OTHER PUBLICATIONS

Firestone, et al., "RTP", Retrieved from: <http://my.safaribooksonline.com/book/telephony/1587052687/lip-synchronization-in-video-conferencing/ch07lev1sec5> on Aug. 21, 2013, Voice and Video Conferencing Fundamentals; Chapter 7. Lip Synchronization in Video Conferencing, Mar. 2007, 4 pages.
(Continued)

Primary Examiner — Faruk Hamza
Assistant Examiner — Aixa Guadalupe-Cruz
(74) Attorney, Agent, or Firm — Schwegman Lundberg & Woessner, P.A.

(57) ABSTRACT

A receiver receives a first data stream and a second data stream from a transmitting device over a packet-based communication network, the first data stream being of a first media type (e.g. audio) and the second data stream being of a second media type (e.g. video). The first jitter buffer will buffer each of a plurality of portions of the first data stream as they are received via the receiver, and apply a de-jittering delay before outputting each portion of the first data stream (e.g. audio stream) to be played out through the receiving device. The jitter buffer controller receives information on the second data stream (e.g. video stream), and adapts the de-jittering delay of the first jitter buffer (e.g. audio jitter buffer) in dependence on the information on the second data stream (e.g. information on the video stream).

24 Claims, 2 Drawing Sheets

(51) Int. Cl.
    *H04N 5/04*     (2006.01)
    *H04N 21/44*     (2011.01)
    *H04N 21/43*     (2011.01)
    *H04N 21/439*     (2011.01)

(52) U.S. Cl.
    CPC ........... *H04N 5/04* (2013.01); *H04N 21/4307* (2013.01); *H04N 21/4392* (2013.01); *H04N 21/44004* (2013.01); *H04L 7/00* (2013.01)

(58) Field of Classification Search
    CPC ............ H04N 21/4788; H04N 21/4394; H04L 7/005; H04L 7/00; H04L 7/0041; H04J 3/0632
    See application file for complete search history.

(56) References Cited

U.S. PATENT DOCUMENTS

| | | | |
|---|---|---|---|
| 8,379,151 | B2 | 2/2013 | Shenoi |
| 2006/0045138 | A1* | 3/2006 | Black .................. G10L 19/005 370/516 |
| 2007/0011343 | A1* | 1/2007 | Davis ................ H04L 29/06027 709/231 |
| 2007/0019931 | A1* | 1/2007 | Sirbu ...................... H04N 5/04 386/207 |
| 2008/0117937 | A1 | 5/2008 | Firestone et al. |
| 2010/0296525 | A1 | 11/2010 | Mahkonen |
| 2012/0069137 | A1 | 3/2012 | Thapa |
| 2013/0100970 | A1 | 4/2013 | Vafin |

OTHER PUBLICATIONS

"International Search Report and Written Opinion", Application No. PCT/US2014/060556, Dec. 19, 2014, 11 pages.

"Second Written Opinion", Application No. PCT/US2014/060556, Sep. 21, 2015, 6 pages.

"Second Written Opinion Issued in PCT Application No. PCT/US2014/060556", dated Sep. 21, 2015, 6 Pages.

"International Preliminary Report on Patentability Issued in PCT Patent Application No. PCT/US2014/060556", dated Dec. 23, 2015, 7 Pages.

* cited by examiner

ADAPTING A JITTER BUFFER

RELATED APPLICATIONS

This application claims priority under 35 USC § 119 or § 365 to Great Britain Patent Application No. 1318653.1 entitled "Adapting a Jitter Buffer" filed Oct. 22, 2013 by Kozica et al., the disclosure of which is incorporate in its entirety.

BACKGROUND

When a data stream such as an audio stream is transmitted over a packet-based network such as the Internet, it is liable to experience some amount of delay due to factors such as packet queuing, route, and/or loss (which may require retransmission). Furthermore, this network delay is not constant but rather varies over time. This effect is known as jitter. In real-time applications such as audio calls or on-demand streaming, jitter can have an adverse effect on the objective and perceived quality of the media as played out at the receive side. For example this may be manifested as a certain "jerkiness" in the play out.

To counter this effect, many receiving devices are equipped with a jitter buffer. A jitter buffer works by buffering the incoming stream and introducing an extra, deliberate delay—the de-jittering delay—between the receipt of data into the buffer from the network and the output of that data from the buffer to be played out. The maximum jitter (i.e. maximum variation in network delay) that the jitter buffer can accommodate is equal to the de-jittering delay. As long as the peak deviation in the network delay does not rise above the length of the de-jittering delay, the decoder will always have a supply of data in the de-jittering buffer to continue decoding and playing out through the receiving device. However, if the deviation in network delay does exceed the length of the de-jittering delay, the decoder will run out of data to decode and instead a concealment algorithm will have to be invoked until more data is received, which will typically generate unnatural sounding artefacts. Hence there is an advantage in introducing a deliberate delay in the form of the jitter buffer.

However, in real-time applications, absolute playout delay can also have a significant effect on the objective and perceptual quality. For example in the case of a call, a delay in the audio may leave the receiving user with sense of unresponsiveness, and the two users may find themselves talking across one another. The delay of the jitter-buffer may therefore be designed to strike a balance between audio play-out delay and audio play-out jitter (delay variations). The jitter buffer may also be configured to dynamically adapt the jitter delay in dependence on channel conditions experienced by the stream over the network. Hence jitter-buffer design is usually concerned with two main problems: (i) characterization of the impact of play-out delay and play-out jitter on perceptual audio quality and (ii) dynamic estimation and prediction of audio-data transmission-jitter and loss in the transmission medium.

SUMMARY

While existing systems may adapt the jitter buffer of a given stream based on the channel conditions experienced by that stream, it is believed that a further factor may have been overlooked: that is, the impact that a data stream of one media type can have on the jitter experienced by a stream of another media type when both being transmitted between the same transmitting and receiving devices. For example in the case of audio-video transmission systems, decisions made by the transmit-side video component can impact audio data transmission jitter and loss seen on the receiver side. Further, the decisions made by the receive-side video component can impact audio data transmission jitter and loss seen on the receiver side.

According to one aspect disclosed herein, there is provided a receiving device comprising a receiver, at least a first jitter buffer, and a jitter buffer controller. The receiver is configured to receive a first data stream and a second data stream from a transmitting device over a packet-based communication network, e.g. the Internet. The first data stream is of a first media type and the second data stream is of a second media type other than the first media type. For example the first stream may be an audio stream and the second stream may be a video stream, e.g. as part of a video call between the transmitting and receiving devices. The first jitter buffer configured to buffer portions of the first data stream as and when received via the receiver, and to apply a de-jittering delay before outputting each portion to be played out through the receiving device. For example the first jitter buffer may be an audio jitter buffer for applying a de-jittering delay to the received audio stream.

Further, the jitter buffer controller is configured to receive information on the second data stream, and to adapt the de-jittering delay of the first jitter buffer in dependence on the information on the second stream. For example the controller may adapt the audio jitter buffer based on information on a received video stream, e.g. both being part of the same video call. In embodiments this information may be received from the transmitting device and/or may be determined at the receiving device. For example, the information used to adapt the audio jitter buffer may comprise or be indicative of: knowledge that the transmit side is about to start or stop transmitting the video; knowledge that the receive side has requested a recovery frame; knowledge of the bitrate, frame rate and/or resolution at which the video is encoded; knowledge of the periodicity or timing of intra frames (key frames) in the encoded video; knowledge of the amount of error correction data being included in the video stream; and/or knowledge of any other relevant factors whereby one stream can affect the jitter of the other.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted in relation to the Background.

BRIEF DESCRIPTION OF THE DRAWINGS

For a better understanding of the described embodiments and to show how it may be put into effect, reference is made by way of example to the accompanying drawings in which.

DETAILED DESCRIPTION OF EMBODIMENTS

The following describes an audio-video transmission system in which the audio-component takes one or more "hints" from the video-component and/or other components, such as a call-signalling component, either by asking or being told, in order to tune the audio jitter-buffer or a joint jitter-buffer dynamically.

Figure 1:
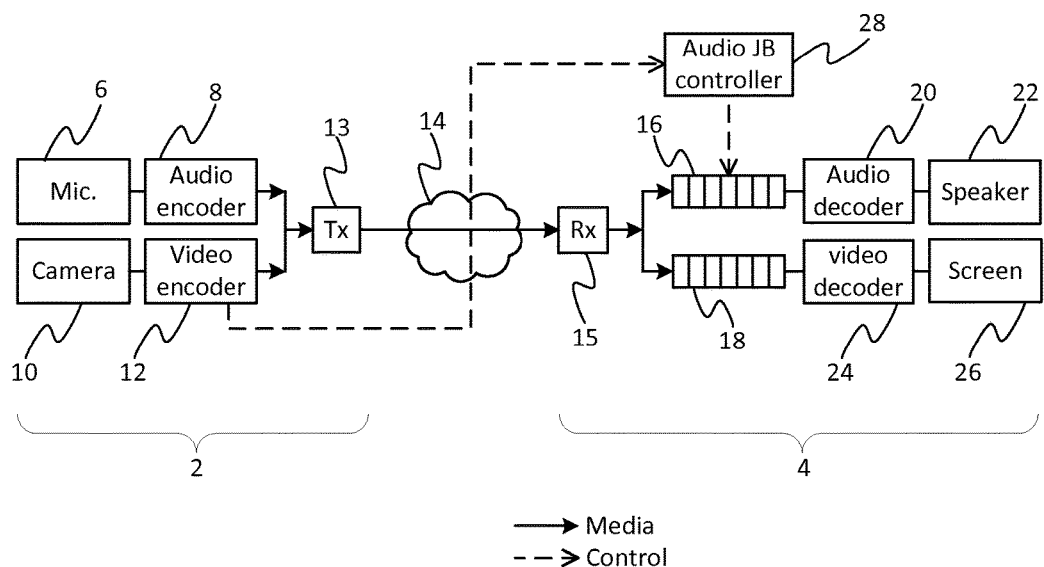
FIG. 1 is a schematic block diagram of a communication system comprising a receiving device with separate audio and video jitter buffers.

FIG. 1 illustrates an example of a communication system comprising a transmitting device in the form of a transmitting user terminal 2, and a receiving device in the form of a receiving user terminal 4. For example each the transmitting terminal 2 and receiving terminal 4 may comprise a desktop or laptop computer, tablet, smartphone or other mobile phone, television or a set-top box.

The transmitting and receiving terminals 2, 4 are each installed with an instance of a communication client application and are thereby configured to conduct a live packet-based video call between one another, over a channel a channel established via a packet-switched communication network 14 such as the Internet or other wide area network or internetwork. For example the call may be a VoIP call. The call comprises transmission of a data stream comprising an audio data stream and a video data stream from the transmitting terminal 2 to the receiving terminal 4, with at least some of the video stream being transmitted and received at the same time as at least some the audio stream. Of course it will be appreciated that the call may also comprise a reciprocal audio and/or data stream in the other direction, but for the sake of illustration the following will be described in terms of a transmission from a "transmitting" side or terminal 2 to a "receiving" side or terminal 4.

The transmitting terminal 2 comprises: an internal or external microphone 6, an audio encoder 8 (e.g. an encoder of a dedicated speech codec or general purpose audio codec), an internal or external camera 10, a video encoder 12, and a transmitter 13. The microphone 6 is coupled to the input of the audio encoder 8, and the output of the audio encoder 8 is coupled to the transmitter 13. The camera 10 is coupled to the input of the video encoder 12, and the output of the video encoder 12 is coupled to the transmitter 13. The receiving terminal 4 comprises a receiver 15, an audio jitter buffer 16, an audio decoder 20 (e.g. a decoder of a dedicated speech codec or a general purpose speech codec), at least one internal or external speaker 22, a video jitter buffer 18, a video decoder 24, an internal or external screen 26, and an audio jitter buffer controller 28. The receiver is coupled to the data input of the audio jitter buffer 16 and the data input of the video jitter buffer 18. The output of the audio jitter buffer 16 is coupled to the input of the audio decoder 20, and the output of the audio decoder 20 is coupled to the speaker 22. The output of the video jitter buffer 18 is coupled to the input of the video decoder 24, and the output of the video decoder 24 is coupled to the screen 26. The jitter buffer controller 28 is coupled to a control input of the audio jitter buffer 16.

Each of the audio encoder 8, video encoder 12, transmitter 13, receiver 15, audio jitter buffer 16, audio decoder 20, video jitter buffer 18, video decoder 24 and audio jitter buffer controller 28 may be implemented wholly or partially in software stored on a storage means comprising one or more storage devices and arranged to be executed on a processor comprising one or more processing units. Alternatively it is not excluded that some or all of this functionality could be implemented in dedicated hardware circuitry, or configurable or reconfigurable circuitry such as a PGA or FGPA. At least some of the transmitter 13 and 15 will be implemented in respective transmitting and receiving front-end hardware. The microphone 6, camera 10, speaker 22 and screen 26 are hardware devices but in embodiments may also comprise some driver software and/or embedded firmware, and may supply or receive data to or from their respective encoder or decoder via other associated software.

Each of the transmitting and receiving terminals 2, 4 also comprise a call signalling protocol (not shown) for setting up the channel between the transmitter 13 and receiver 15 via the network 14, and for performing the associated control signalling involved in conducting a call over this channel. The transmitting terminal 2 may be arranged to run client application such as a VoIP client, of which the audio encoder 8, video encoder 12 and/or transmit-side call signalling protocol may be a part; and similarly the receiving terminal 4 may be arranged to run a communication client application such as a VoIP client of which the audio decoder 20, video decoder 24 and/or receive side call signalling may be a part. Alternatively any one or more of these could be implemented at a lower level than the application layer, or invoked via an interface to another application.

The microphone 6, audio encoder 8, audio jitter buffer 16, audio decoder 20, speaker 20 and audio jitter buffer 28 form an audio component of the system; comprising a transmit-side audio component 6, 8 and a receive-side audio component 16, 20, 22, 28. The camera 10, video encoder 12, video jitter buffer 18, video decoder 24 and screen 26 form a video component of the system; comprising a transmit-side video component 10, 12 and a receive-side video component 18, 24, 26. The end-to-end call signalling protocol forms a call-signalling component, comprising a transmit-side call signalling component and a receive-side call signalling component.

In operation, the microphone 6 captures audio data from its surroundings and supplies this audio data to the input of the audio encoder 8. The audio encoder 8 encodes the audio data to compress it for transmission, thus producing an encoded audio data stream which it outputs to the transmitter 13. Similarly, the camera 10 captures video data from its surroundings and supplies this video data to the input of the video encoder 12. The video encoder 12 encodes this video data to compress it for transmission, thus producing an encoded video data stream which it outputs to the transmitter 13. For example the encoding may comprise encoding frames of speech or video using intra frame prediction coding (encoding internally within a given frame) or inter frame prediction coding (encoding a frame relative to one or more other frames of the stream). An intra frame incurs more bits in the encoded stream but is independently decodable, whereas an inter frame incurs fewer bits but cannot be decoded if the data of the frame from which it was predicted is lost or corrupted.

The transmitter 13 transmits a stream of data comprising the audio stream and video stream to the receiver 15 over the channel established via the network 15. This will include packetizing the data into packets of the relevant protocol, e.g. Internet Protocol (IP) in the case of a VoIP call. The transmission may occur under the control of the control signalling protocol operating at a higher layer.

The receiver 15 receives the stream of packetized data from the transmitter 13, de-packetizes it, and separates out the (encoded) audio and video streams which it supplies to the data inputs of the audio and video jitter buffers 16, 18 respectively. The audio stream is buffered through the audio jitter buffer 16 and output to the audio decoder 20 to be played out. The audio decoder 20 decodes the audio stream as it emerges from the audio jitter buffer 16, and outputs the resulting decoded audio content to the speaker(s) 22 where the audio is ultimately converted into sound to be heard by the user of the receiving terminal 4. Similarly, the video stream is buffered separately through the separate video jitter buffer 18 and output to the video decoder 24 to be played out. The video decoder 24 decodes the video stream as it emerges from the video jitter buffer 18, and outputs the resulting decoded video content to the screen 26 where it is ultimately displayed to be viewed by the receiving user. Note that in alternative embodiments, the audio and/or video jitter buffer 16, 18 may be placed after its respective decoder 20, 24 so as to buffer the decoded version of the data. The scope of the present disclosure covers either option.

The call is by its nature a real-time communication, meaning that the respective media of each stream continues to be captured in an ongoing fashion at the transmit side 2 for encoding and transmission over the channel to the receive side 4 even while previously transmitted media of that same stream is being played out at the receive side 4. Each stream should also be played out at the receive side 4 on average at approximately the same speed as the real-world event from which it is being captured at the transit side 2 actually occurs. So in the case of an audio stream, the sound continues to be captured by the microphone 6 to be encoded by the audio encoder 8 and transmitted over the channel whilst previously transmitted audio of that stream is played out from the speaker 22 in an ongoing manner; and the received, decoded audio should be played out on average at the same speed as the physical sound from which it is being captured is actually produced (e.g. the same speed as the speech is actually spoken). In the case of a video stream, the image data continues to be captured by the camera 10 to be encoded by the video encoder 10 and transmitted over the channel whilst previously transmitted video of that stream is played out from the screen 24 in an ongoing manner; and the received, decoded video should be played out on average at the same speed as the scene from which it is being captured is actually enacted (e.g. to follow the transmitting user's face, limbs or body in a video call). Put another way, the playing out of the media at the receive side 4 should reflect the passage of time in real-life at the transmit side 2. Furthermore, it is desirable for each stream to be played out relatively smoothly.

However, packets of the streams will experience a delay during their transmission over the network 14. Further, different packets of a given stream will experience different delays, so there will be a variation in delay experienced by different portions of data in the same stream. As mentioned, this effect is known as jitter.

To accommodate for this, the receiving terminal 4 comprises one or more jitter buffers which apply a deliberate de-jittering delay to incoming data of the streams received over the network 14. In the system of FIG. 1, the receiving terminal 4 comprises an audio jitter buffer 16 arranged to buffer the incoming audio stream, and a separate video buffer 18 arranged to buffer the incoming video stream. The audio jitter buffer 16 applies a de-jittering delay to each portion of the incoming audio stream as and when received from the transmitting terminal 2 via the receiver 15, before forwarding each portion on to the audio decoder 20 to be decoded for play out. Similarly, the video jitter buffer 18 applies a de-jittering delay to each portion of the incoming video stream as and when it is received from the transmitting terminal 2 via the receiver 15, before forwarding each portion on to the video decoder 24 to be decoded for play out. Note that where it is said a jitter buffer applies a delay to a stream or each portion of a stream "before" being output for play our, or the like, this does not mean the whole stream or every portion is held back together only to be output once the whole stream has been received. Rather, it means that each portion is delayed individually on a portion-by-portion basis, so that a given portion of data is held back for a delay running from the time that respective portion arrived in the jitter buffer. Thus some portions of the received data are released from the jitter buffer while others are still being buffered and others are yet to arrive or yet to be transmitted, and so forth. In embodiments the jitter buffer may for example perform the buffering in units of frames of the audio or video content to be decoded, or in units of packets of the incoming packet protocol of the received stream (so the portions may be frames or packets, or alternatively may be any other unit of data).

The effect of a jitter buffer is that even if the delay experienced by a stream across the network 14 increases above the average, the jitter buffer has retained a deliberate "backlog" of data that the receiving terminal 4 can continue playing out to keep the media flowing smoothly from the perspective of the receiving user. The jitter buffer will start to empty, but assuming the increase in delay was a fluctuation rather than a systematic increase, then the jitter buffer will begin to fill up again once the delay swings back the other way below the average. The maximum variation that a jitter buffer can accommodate for (in terms of maximum variation from the average) is equal to the length (delay) of the jitter buffer. Hence the longer the delay, the less susceptible the receiving terminal 4 is to jitter.

However, if the total absolute delay between capture and playout gets too long, this will also have an impact on the quality experienced by the receiving user. Therefore to try to strike a balance between jitter and absolute delay, the receiving terminal 4 is equipped with at least an audio jitter buffer controller 28 configured to dynamically adapt the de-jittering delay of the audio jitter buffer 16. That is, to adjust it "on the fly" in response to changing circumstances, as and when changes are experienced.

Figure 2:
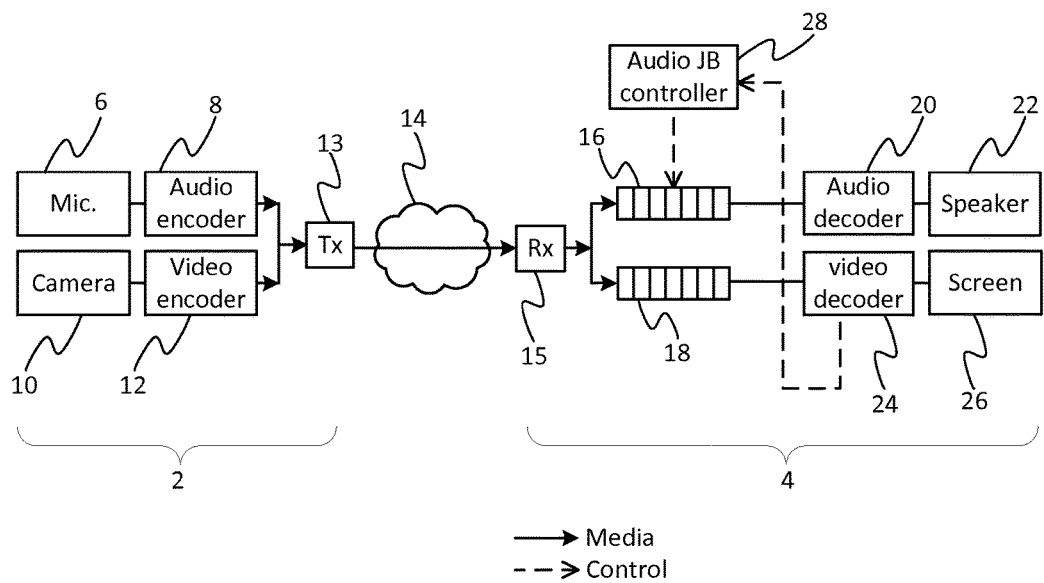
FIG. 2 is another schematic block diagram of a communication system comprising a receiving device with separate audio and video jitter buffers.

According to embodiments disclosed herein, the jitter buffer controller 28 is configured to perform this dynamic adaptation at least partially in dependence on one or more "hints" providing information relating to one or more aspects the video stream that have the potential to affect the jitter of the audio stream. In embodiments one or more such hints may be provided from the transmit side 2. In FIG. 1 the hints are shown emanating from the video encoder 12, but in embodiments this may generally represent signalling from the video encoder 12 or any component associated with transmitting video via the encoder 12, e.g. a transmit-side call signalling component. As shown in FIG. 2, one or more of the hints may alternatively or additionally be provided from the receive side 2. In FIG. 2 the hints are shown emanating from the video decoder 24, but in embodiments this may generally represent signalling from the video decoder 24 or any component associated with receiving video via the decoder 24, e.g. a receive-side call signalling component.

In some embodiments the jitter buffer controller 28 may additionally adapt the de-jittering delay in response to channel conditions (i.e. network conditions affecting the transmission of the video stream between the transmitting terminal 2 and receiving terminal 4).

The one or more hints may comprise or be indicative of knowledge such as (but not limited to):
- that the transmitter has started, stopped, paused or resumed transmission of the video stream or is about to do so;
- that the transmitting device is transmitting or about to transmit periodic intra frames of the video stream, their frequency and/or expected arrival times;
- the bitrate, frame rate, resolution, and/or amount or error correction being used or about to be used in the encode video stream;
- a region of interest in the second data stream (many encoders allow a region of interest to be defined within the frame area, in which region more bits are spent on the encoding to provide a higher quality than the remaining background region);
- the camera being used to capture the vide stream at the transmit side; and/or
- an indication that the transmitting terminal is about to be panned or undergo some other motion affecting capture of the video stream.

For example, the hints may comprise knowledge that the sender side 2 is making a significant change to the video stream, e.g. by restarting the video, changing camera, switching video resolution, and/or changing the level of error-correction data; and/or may comprise knowledge of an expected bit-rate and frame-rate for the video stream after such a change.

Such information (where it relates to the current or intended future state of the video stream) could be signalled explicitly or implicitly from the transmit side 2; and/or (where it relates to the current or predicted future state of the video stream) could be extracted or inferred from observation of the received video stream or associated call signalling at the receive side 4, e.g. by monitoring an average of one or more properties such as bitrate or frame rate, etc., observing when the video starts and stops, and/or making predictions of such information from past behaviour. Where signalled from the transmit side it may be signalled by the encoder 12 or another transmit-side component such as a transmit side call signalling component. For example, information on when the transmit side 2 will start and/or stop transmitting video may be known as part of call signalling or video stream negotiation; and/or information on the bitrate, frame rate and/or resolution may be signalled by the encoder 12 in the encoded video stream or by a higher level.

Alternatively or additionally, as another option one or more of the above hints could be extracted or inferred from the video stream or associated call signalling by an intermediate network element via which that stream is transmitted from the transmitting terminal 2 to the receiving terminal 4, being a network element of the packet-based communication network 14 such as a server. The information can then be signalled from the intermediate network element to the jitter buffer controller 28 on the receiving terminal 4.

In yet further embodiments, the hints may alternatively or additionally comprise information generated at the receive side itself. This may comprise the knowledge that the receiver side video-component has requested some behaviour from the transmit-side video-component, for example (but not limited to):
- the receiving terminal 4 has requested a recovery frame to be included in the second data stream (recovery frames are intra frames requested by the receive side when the decoding state has been lost due to loss or corruption);
- the receiving terminal 4 has requested that the video encoder 12 at the transmit side 2 applies a region of interest in the second data stream; and/or
- the receiving terminal 4 has requested the transmitting terminal to perform a panning operation or other motion affecting capture of the second data stream For example, the hints may comprise knowledge that the receive side 4 has requested the generation of a recovery frame due to packet loss, or change of changes region of interest.

One or more hints about the video stream, such as the kinds exemplified above, may be used by the jitter buffer controller 28 to adjust the tuning of the audio jitter-buffer 16. For example, the adaptation may comprise increasing the de-jittering delay when one or more hints are indicative of some change meaning that the bitrate incurred by video over the channel has increased or is expected to increase, and decreasing the de-jittering delay when one or more hints are indicative of some change meaning that the bitrate incurred by video over the channel has decreased or is about to decrease. In embodiments, one or of the more hints may be used to alter the tuning algorithm of the audio jitter-buffer 16, to change the behaviour of the jitter-buffer 16 in a predefined manner based on attained hints. For example if the jitter buffer controller 28 also adapts the jitter buffer 16 in response to one or more other factors such as channel conditions, then in response to one or more hints about the vide stream, the controller 28 may be configured to select between different adaptive jitter buffering algorithms, each which adapt according to a different behaviour. Alternatively or additionally, in embodiments the hints may be used to train a model for estimation and prediction of transmission-data jitter and loss independently for each event in a predefined set of events based on attained hints; and/or adjust a general model for estimation and prediction of transmission-data jitter and loss with a correction that is specific for each event in a predefined set of events based on attained hints.

As a result of the above adaptation, the audio jitter-buffer 16 is made prepared for network changes that are introduced by video or other components. For instance, in an audio only call, the jitter-buffer 16 will be tuned to run at the minimal delay that network allows. Then when the receiver side 4 knows that sender side 2 is starting video (e.g. as part of call-signalling), it knows that audio will be competing for network resources with video and likely will experience more delay, jitter and/or loss in the audio data. By knowing this information ahead of time, the controller 28 and jitter buffer 16 can stretch the play-out signal and add delay to the jitter-buffer 16. This will reduce the probability of audio loss concealment, and help maintain the audio quality.

For instance, consider again a receiving terminal 4 where the audio and video components use separate jitter-buffers 16, 18 as in FIG. 1 and/or FIG. 2. The video component gathers hints of significance and makes them available to the audio component. This can be done either by providing the hints periodically, providing the new hints when significant events occur, or by answering when the audio component asks for the hints. Given a hint, the audio jitter buffer 16 behaviour is adjusted to better handle the situation indicated by the hint.

In one embodiment, the hint may indicate that the video component expects an increased amount of incoming video-data for a short period of time, i.e. a video bit-rate spike. The hint itself may for example indicate: that a periodic key-frame should arrive soon according to the sender, that a recovery frame has been requested, that a video restart has been requested, and/or that a panning operation has been requested. The audio jitter-buffer controller 28 then adjusts the play-out speed such that the audio buffer-level is increased and an increase in jitter will not result in audio cut-outs in the playout.

In another embodiment, the hint may indicate that the video component expects an increased amount of incoming video-data for an undetermined longer period of time. The hint itself may for example indicate that: the long-term bit-rate of video has changed to a certain level, that the long-term frame-rate of video has changed to a certain level, that the level of error-correction data has changed to a certain amount, that video has been paused or stopped, and/or that video has started or resumed. Any of the example hints may be communicated by the sender video component or estimated by the receiver video component. The audio jitter-buffer controller 28 then adjusts the estimation and prediction of transmission-data jitter and loss in a way that is the most suited for the hint. For example, in the case of the hint "video has been paused or stopped", the jitter-buffer play-out schedule may be adjusted to allow a lower average audio delay and the estimation and prediction of transmission-data jitter and loss could be restarted to avoid bias from traffic with video data.

Figure 3:
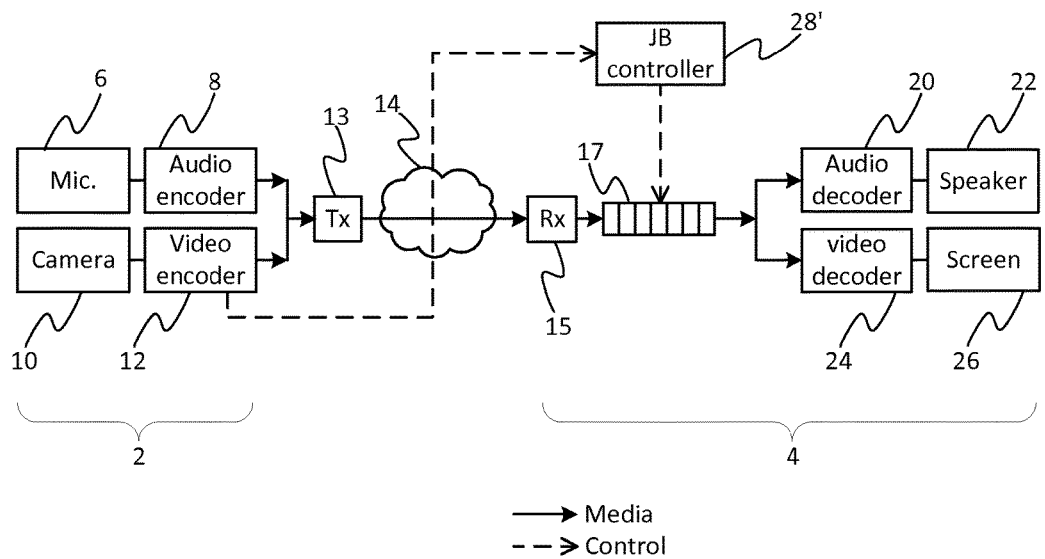
FIG. 3 is a schematic block diagram of a communication system comprising a receiving device with a joint jitter buffer.
Figure 4:
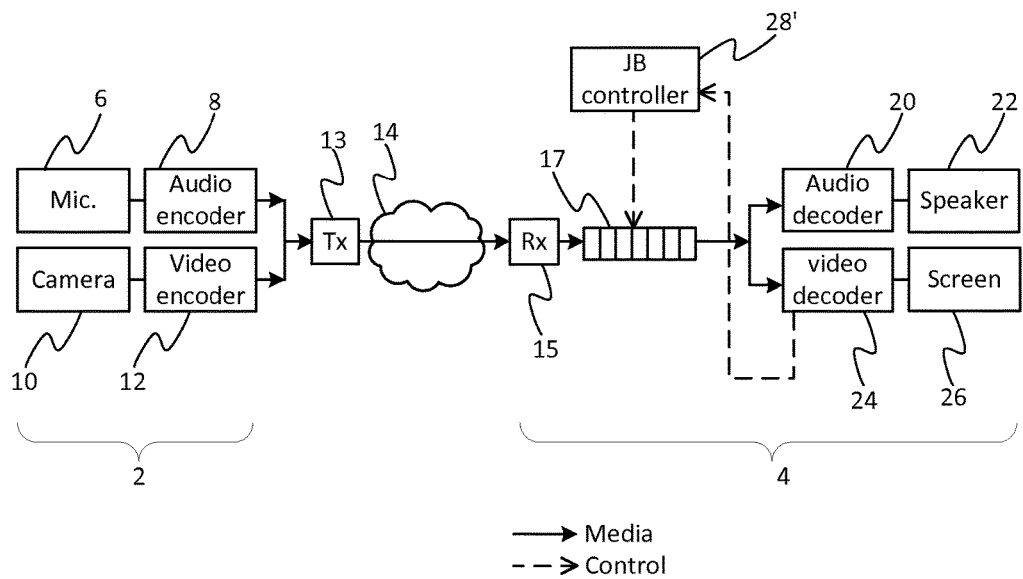
FIG. 4 is another schematic block diagram of a communication system comprising a receiving device with a joint jitter buffer.

In further embodiments, the receiver side 4 may comprise a joint jitter-buffer for both the audio and video components as illustrated in FIG. 3 and FIG. 4. In this case the data from both the audio and video streams are input together into the same joint jitter buffer 17, which applies a de-jittering delay to each portion of both streams. The portions of audio and video data remain interleaved or otherwise unseparated in the joint jitter buffer 17 and are only separated after they are output from the jitter buffer 17 following the de-jittering delay. In such embodiments, the joint jitter buffer 17 may be adapted dynamically by a joint jitter buffer controller 28', in response to one or hints about the video stream such as those exemplified above, and in a manner as discussed above. The video component gathers hints of significance and makes then available to the controller 28' of the joint jitter-buffer. This can be done either by providing the hints periodically, providing the new hints when significant events occur, or by answering when the joint jitter-buffer controller asks for the hints. Given a hint, the joint audio jitter buffer behaviour is adjusted to better handle the situation indicated by the hint. Embodiments may handle hints in a similar manner as discussed in relation to FIGS. 1 and 2.

It will be appreciated that the above embodiments have been described only by way of example.

For instance, in embodiments the video jitter buffer 18 may also be equipped with a jitter buffer controller which may be configured to adapt the de-jittering delay of the video jitter buffer 18, either in response to hints about the audio stream in an analogous manner to that described above (but vice versa), and/or in response to other factors such as channel conditions. In embodiments the adaptation is at least applied to the audio jitter buffer 16 based on the video stream, because audio is generally more susceptible to jitter while the video incurs more bitrate resource in the transmission and so is liable to cause a significant impact on the audio, and in embodiments the adaptation may be applied both ways around so that the video jitter buffer 18 is also adapted based on the audio. However, it is not excluded that the adaptation could be applied only to the video buffer 18 in dependence on the audio.

Further, the disclosed techniques may be applied to other kinds of streamed communication such as on-demand video, e.g. on-demand television programs or films from a streaming service. Further, the streams are not limited to video and audio, and one or more of the streams could instead be: a stream of live screen sharing data by which the receiving terminal displays what's on the transmitting terminal's screen, a stream of live in-game data communicating real-time events in an online game being played between the transmitting and receiving terminals (character movements etc.), or a file transfer (not in itself real-time but it may affect another stream that is). There are various combinations of streams and various possibilities for the adaptation of one stream's jitter buffer in dependence on another stream of another type.

For example, the first stream may be a stream of a computer game being played between the transmitting and receiving terminals 2, 4, and the second stream may be the audio and/or video of a call being conducted in parallel between the same transmitting and receiving terminals 2, 4. In this case it may be desired that the jitter buffer of the game data stream is a adapted in dependence on the audio and/or video, e.g. because the game data is most sensitive to jitter while the audio and/or video data incurs more bitrate resource in transmission and so is liable to cause an impact on the game stream.

In another example, the first stream may be an audio and/or video of a call and the second stream may be a file transfer. The file transfer is not sensitive to jitter at all (and does not require a jitter buffer of its own), but is liable to have an impact on the jitter of the call.

In further embodiments, screen sharing may be considered somewhat analogous to video and where a feature is described above in relation video, it also may be applied in an analogous fashion in relation to screen sharing. In embodiments, the screen sharing stream may or may not require a jitter buffer of its own. Although it is live, the screen sharing stream may be considered insensitive enough to jitter that this is not required.

Furthermore, many of the above hints can apply in an analogous manner to other types of media stream. For instance, frame rate or recovery frames could refer to frames of a voice codec; resolution could refer to a number of samples per unit time in a speech or an audio stream; and/or motion could affect capture of voice or other audio data, as could a change of microphone. Further, factors such as bitrate and amount of error correction data are applicable to any kind of stream.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described herein are platform-independent, meaning that the techniques may be implemented on a variety of commercial computing platforms having a variety of processors.

For example, the terminals may include an entity (e.g. software) that causes hardware of the user terminals to perform operations, e.g., processors functional blocks, and so on. For example, the terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A receiving device comprising:
a receiver configured to receive an audio data stream and a video data stream from a transmitting device over a packet-based communication network;
a first jitter buffer configured to:
buffer respective portions of the audio data stream is received via the receiver; and
apply a de-jittering delay before outputting the respective portions of the audio data stream to be played; and
a jitter buffer controller of the receiving device configured to:
receive, from the transmitting device, information on the video data stream indicating changes made by the transmitting device to the video data stream that indicates that indicates a predicted increased amount of incoming video data; and
adjust the de-jittering delay of the first jitter buffer based on the information on the video data stream.

2. The receiving device of claim 1, comprising:
a second jitter buffer separate from the first jitter buffer, configured to:
buffer respective portions of the video data stream received via the receiver; and
apply a de-jittering delay before outputting the respective portions of the video data stream to be played; and
wherein the jitter buffer controller is configured to adjust the de-jittering delay of the first jitter buffer based on the information on the video data stream.

3. The receiving device of claim 1, wherein the first jitter buffer is further configured to buffer respective portions of the video data stream received via the receiver, and to apply the de-jittering delay before outputting the respective portions of the audio data stream and video data stream to be played.

4. The receiving device of claim 1, wherein a jitter buffer of the video data stream is not adapted by the jitter buffer of the receiving device based on the received information.

5. The receiving device of claim 1, wherein one or more of: the audio data stream or video data stream are received as part of a call conducted with the transmitting device.

6. The receiving device of claim 1, wherein the information on the video data stream comprises information from an encoder of the transmitting device.

7. The receiving device of claim 1, wherein the information on the video data stream one or more of:
an indication that the transmitting device is about to start, stop, pause or restart transmission of the video data stream;
an indication that the transmitting device is transmitting or about to transmit periodic intra frames of the video data stream, their frequency and/or expected arrival times;
an indication of one or more of: a bit rate, a frame rate, or a resolution at which the transmitting device is encoding or about to encode the video data stream for transmission;
an indication of an amount of error-correction data that the transmitting device is including or about to include in the video data stream;
an indication of a region of interest in the video data stream;
an indication of a camera or other input transducer being used or about to be used to capture the video data stream; and/or
an indication that the transmitting device is about to undergo a panning operation or other motion affecting capture of the video data stream.

8. The receiving device of claim 1, wherein the information on the video data stream further comprises information determined at the receiving device.

9. The receiving device of claim 8, wherein the information determined by the receiving device comprises one or more of:
detecting a start, stop, pause or restart in the reception of the video data stream;
detecting an occurrence of one or more of: the frequency of, or expected arrival times of periodic intra frames in the video data stream;
detecting a bit rate and/or frame rate at which the video data stream is encoded; and/or
detecting an amount of error correction data in the video data stream.

10. The receiving device of claim 8, wherein the information determined by the receiving device comprises information on one or more requests made by the receiving device to the transmitting device.

11. The receiving device of claim 10, wherein the one or more requests comprise one or more of:
a request for a recovery frame to be included in the video data stream;
a request to apply a region of interest in the video data stream; or
a request for the transmitting device to perform a panning operation or other motion affecting capture of the video data stream.

12. The receiving device of claim 1, wherein the information on the video data stream further comprises information determined by and received from an intermediate element of the packet-based communication network.

13. The receiving device of claim 1, wherein the first jitter buffer is also configured to adjust the de-jittering delay of the first jitter buffer in response to channel conditions experienced between the transmitting and receiving devices over said packet-based communication network.

14. The receiving device of claim 1, wherein the packet-based communication network comprises the Internet.

15. The receiving device of claim 1, wherein the information on the video data stream indicating changes made by the transmitting device to the video data stream comprise information regarding changes to aspects of capturing and/or decoding the video data stream that takes place at the transmitting device.

16. A computer-readable memory device storing instructions, which when executed by a computer, cause the computer to perform operations comprising:
receiving an audio data stream and a video data stream from a transmitting device over a packet-based communication network;
buffering, at a first jitter buffer, respective portions of the audio data stream as the audio data stream is received via the receiver;
applying a de-jittering delay before outputting the respective portions of the audio data stream to be played;
receiving, from the transmitting device, information on the video data indicating changes made by the transmitting device to the video data stream that indicates a predicted increased amount of incoming video data; and
adjusting the de-jittering delay of the first jitter buffer based on the information on the video data stream.

17. The computer-readable memory device product of claim 16, wherein the audio data stream and the video data stream are received as part of a call conducted with the transmitting device.

18. The computer-readable memory device of claim 16, wherein the information from the transmitting device comprises one or more of:
an indication that the transmitting device is about to start, stop, pause or restart transmission of the video data stream;
an indication that the transmitting device is transmitting or about to transmit periodic intra frames of the video data stream, their frequency or expected arrival times;
an indication of a bit rate, frame rate or resolution at which the transmitting device is encoding or about to encode the video data stream for transmission;
an indication of an amount of error-correction data that the transmitting device is including or about to include in the video data stream;
an indication of a region of interest in the video data stream;
an indication of a camera or other input transducer being used or about to be used to capture the video data stream;
an indication that the transmitting device is about to undergo a panning operation or other motion affecting capture of the video data stream.

19. The computer-readable memory device of claim 16, wherein the information on the video data stream indicating changes made by the transmitting device to the video data stream comprise information regarding changes to aspects of capturing and/or decoding the video data stream that takes place at the transmitting device.

20. A computing device comprising:
a receiver configured to receive an audio stream and a video stream from a transmitting device over a packet-based communication network;
an audio jitter buffer configured to:
buffer respective portions of the audio stream received via the receiver; and
apply a de-jittering delay before outputting the respective portions of the audio stream to be played;
a video jitter buffer configured to;
buffer each of a plurality of portions of the video stream received via the receiver, and
apply a second de-jittering delay before outputting the respective portions of the video stream to be played; and
a jitter buffer controller configured to:
receive information on the video stream from a transmitting device indicating changes made by the transmitting device to the video stream that indicates a predicted increased amount of incoming video-data; and
adjust the de-jittering delay of the audio jitter buffer based on the information on the video stream.

21. The user terminal of claim 20, wherein the information on the video stream further comprises information determined at the user terminal, the information determined by the user terminal comprising one or more of:
detecting a start, stop, pause or restart in the reception of the video stream;
detecting an occurrence of periodic intra frames in the video stream, their frequency or expected arrival times;
detecting a bit rate and/or frame rate at which the video stream is encoded; and/or
detecting an amount of error correction data in the video stream.

22. The user terminal of claim 18, wherein the jitter buffer controller is further configured to adapt the de-jittering delay of the audio jitter buffer in response to channel conditions experienced between the transmitting device and the user terminal over the packet-based communication network.

23. The user terminal of claim 18, wherein image data included in the video stream is captured by a camera of the transmitting device.

24. The user terminal of claim 20, wherein the information on the video stream indicating changes made by the transmitting device to the video data stream comprise information regarding changes to aspects of capturing and/or decoding the video data stream that takes place at the transmitting device.

\* \* \* \* \*